(12) United States Patent
Reilly et al.

(10) Patent No.: US 6,749,185 B1
(45) Date of Patent: Jun. 15, 2004

(54) CUSHION ASSEMBLY AND METHOD

(75) Inventors: Steven J. Reilly, Westlake, OH (US); Michael V. Sanchez, Akron, OH (US)

(73) Assignee: Barnes Group Inc., Bristol, CT (US)

( * ) Notice: Subject to any disclaimer, the term of this patent is extended or adjusted under 35 U.S.C. 154(b) by 0 days.

(21) Appl. No.: 10/417,648

(22) Filed: Apr. 17, 2003

(51) Int. Cl.[7] .................................................. F16F 5/00
(52) U.S. Cl. ...................... 267/119; 267/130; 188/269; 188/322.17; 72/453.13
(58) Field of Search ................................ 267/119, 130, 267/124, 64.28, 64.26; 188/322.17, 269, 315, 322.19, 322.16, 322.21; 184/6.8, 18; 91/46; 92/150; 72/453.13

(56) References Cited

U.S. PATENT DOCUMENTS

| | | |
|---|---|---|
| 4,691,902 A | 9/1987 | Kadis |
| 4,815,718 A * | 3/1989 | Kadis .......................... 267/119 |
| 6,022,004 A | 2/2000 | Kelm et al. |
| 6,059,273 A | 5/2000 | Sand et al. |
| 6,068,245 A | 5/2000 | Roper |
| 6,170,809 B1 | 1/2001 | Cotter |
| 6,322,059 B1 | 11/2001 | Kelm et al. |

* cited by examiner

*Primary Examiner*—Douglas C. Butler
(74) *Attorney, Agent, or Firm*—Fay, Sharpe, Fagan, Minnich & McKee, LLP

(57) ABSTRACT

A cushion assembly includes a lower end wall which is at least partially enclosed by a tubular cylindrical outer wall. An upper end wall is also partially enclosed by the outer wall. A tubular cylindrical inner wall extends between recesses in the lower end wall and the upper end wall. A piston is disposed within the inner wall and is movable along the inner wall toward the upper end wall under the influence of gas pressure. The piston is movable along the inner wall toward the lower end wall of the influence of force applied against the piston during operation of a press. A passage is formed between an end portion of the inner wall and the lower end wall to conduct a flow of lubrication liquid and gas to lubricate the piston.

8 Claims, 3 Drawing Sheets

CUSHION ASSEMBLY AND METHOD

BACKGROUND OF THE INVENTION

The present invention relates to a new and improved cushion assembly for cushioning movement of a member in a press during operation of the press and to a method by which the cushion assembly is assembled.

Cushion assemblies have previously been utilized to cushion movement of one or more members in a press. These cushion assemblies commonly include a cylinder in which a piston is movable against the influence of fluid pressure to cushion movement of a member in the press as the press is operated from an open condition to a closed condition. Known cushion assemblies are disclosed in U.S. Pat. Nos. 4,691,902; 6,022,004; and 6,322,059.

Although these known cushion assemblies are generally satisfactory in their construction and mode of operation, there is a continuing effort to simplify the construction of the cushion assemblies in order to increase durability and reliability of the cushion assemblies. In addition, simplifying the construction of the cushion assemblies decreases the cost of the cushion assemblies. When the construction of a cushion assembly is simplified, the number of components which must be maintained by a manufacturer of the cushion assembly may be reduced with a resulting savings in cost.

SUMMARY OF THE INVENTION

The present invention includes a new and improved cushion assembly for use in a press. The cushion assembly has tubular cylindrical inner and outer walls. The outer wall encloses lower and upper end walls. The inner wall has lower and upper end portions which are disposed in recesses in the lower and upper end walls. A piston is disposed in the inner wall. A piston rod extends through an opening in the upper end wall.

A passage is formed between an end portion of the inner wall and the lower end wall. This passage conducts a flow of lubrication liquid and gas to lubricate components of the cushion assembly during operation of the press.

The cushion assembly may be assembled by positioning a first lock ring in a first groove formed in an outer wall of the cushion assembly. A first end wall is then moved along an inner side surface of the outer wall into engagement with the first lock ring. A tubular inner wall is positioned in a recess in a second end wall. A piston is positioned in the inner wall. The inner wall, second end wall, and piston are moved together into the outer wall. A second lock ring is then positioned in a second groove formed in the outer wall.

BRIEF DESCRIPTION OF THE DRAWINGS

The foregoing and other objects and features of the present invention will become more apparent upon a consideration of the following description taken in connection with the accompanying drawings wherein.

DESCRIPTION OF A SPECIFIC PREFERRED EMBODIMENT OF THE INVENTION

Cushion Assembly

Figure 1:
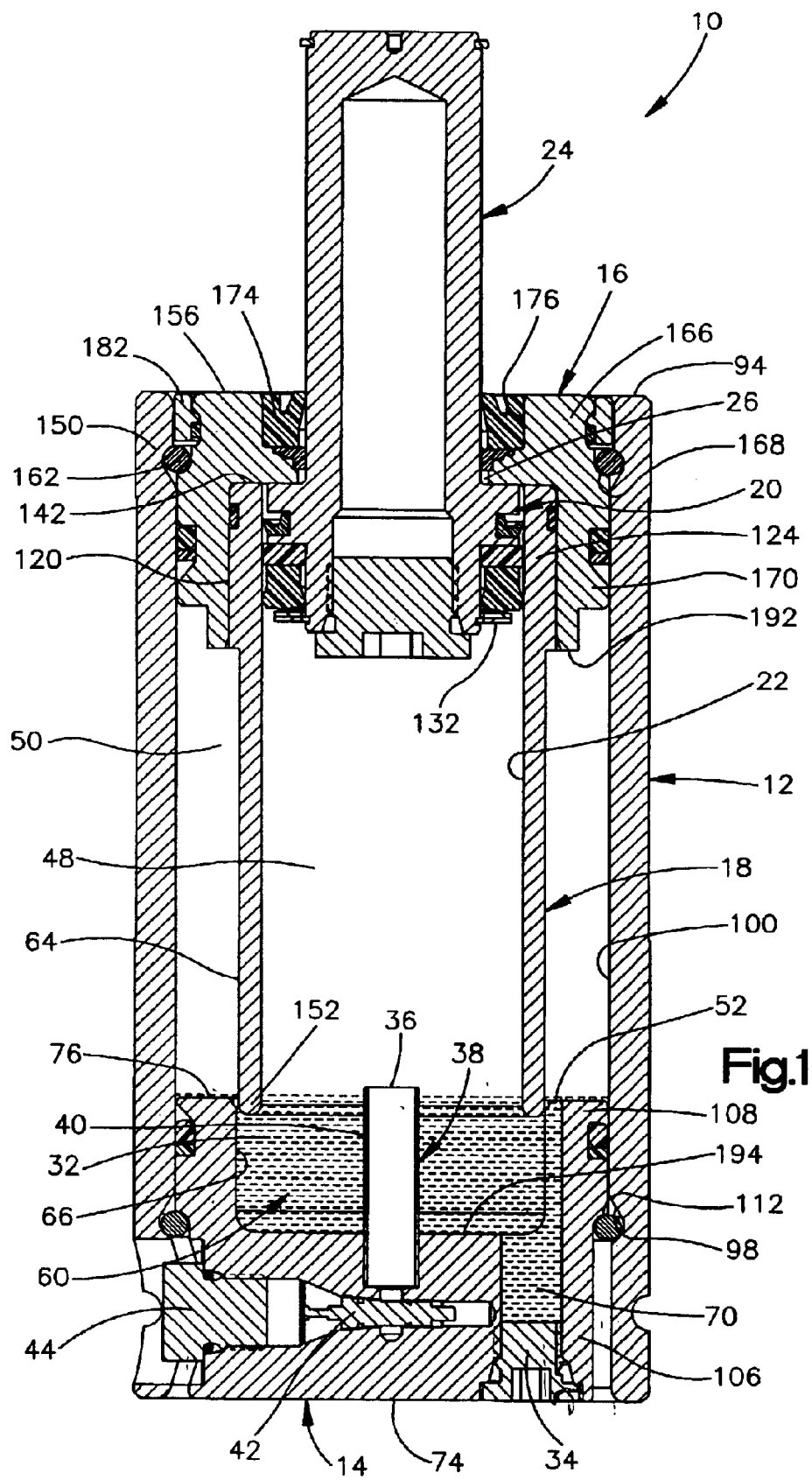
FIG. 1 is a sectional view of a cushion assembly constructed in accordance with the present invention.

A cushion assembly 10 (FIG. 1) is used to cushion motion of a member in a press during operation of the press. Although the cushion assembly 10 may be utilized in many different ways and in many different types of presses, the cushion assembly may advantageously may be utilized in a press in the manner disclosed in U.S. Pat. Nos. 4,688,775; 5,003,807; and/or 6,322,059. It should be understood that the cushion assembly 10 may be utilized in many different ways in many different types of presses and that the foregoing patents disclosing ways in which a cushion assembly may be used in a press are to be considered as being exemplary of the many different ways in which the cushion assembly 10 may be utilized in a press.

The cushion assembly 10 includes a tubular cylindrical outer wall 12. The tubular cylindrical outer wall 12 extends around a circular lower end wall 14 and a circular upper end wall 16. A tubular cylindrical inner wall 18 extends between the lower end wall 14 and the upper end wall 16.

A cylindrical piston 20 is disposed in the inner wall 18 and is axially movable along a cylindrical inner side surface 22 of the inner wall 18. A cylindrical piston rod 24 extends outward from the piston 20 through a circular opening 26 in the upper end wall 16. The metal outer wall 12, lower end wall 14, upper end wall 16, inner wall 18, piston 20 and piston rod 24 are all disposed in a coaxial relationship.

The lower end portion of the cushion assembly 10 is filled with a lubrication liquid 32 through a fill plug 34. The fill plug 34 has a rupture disc to limit the maximum fluid pressure within the cushion assembly 10. The lubrication liquid 32 fills the lower end portion of the cushion assembly 10 to a level below an upper end 36 of a cylindrical standpipe 38.

After the lubrication liquid has been conducted into the cushion assembly 10 and the plug 34 screwed into place, the cushion assembly is filled with a gas through schrader valve 42. To fill the cushion assembly with gas, a plug 44 is removed and the valve 42 is connected with a source of gas, specifically, nitrogen, under pressure. The gas flows from the valve 42 (FIG. through the standpipe 38 into an inner variable volume chamber 48 formed in the inner wall 18 between the piston 20 and the lower end wall 14.

The gas (nitrogen) flows from the generally cylindrical inner chamber 48 into a cylindrical outer chamber 50 through a passage 52. The outer chamber 50 is formed between the cylindrical inner wail 18 and the cylindrical outer wall 12. Opposite ends of the outer chamber 50 are closed by the lower end wall 14 and the upper end wall 16. The cushion assembly may be filled with gas at a pressure of approximately 2,000 psi.

When the cushion assembly 10 has been installed in a press assembly, the cushion assembly will be in the extended condition illustrated in FIG. 1 when the press assembly in an open condition. At this time, the piston 20 is pressed against the upper end wall 16 of the cushion assembly 10 by fluid (nitrogen gas) pressure which is present in the inner chamber 48 and outer chamber 50. At this time, the lubrication liquid 32 will have collected in the lower end portion of the cushion assembly 10, in the manner illustrated schematically in FIG. 1. The passage 52 is at least partially filled by the body of lubrication liquid 32.

When the press assembly is operated from the open condition to a closed condition, force is applied against the piston rod 24 by the press assembly. This force moves the piston 20 downward (as viewed in FIG. 1) in the inner chamber 48 of the cushion assembly 10. As this occurs, the gas in the inner chamber 48 is compressed. This results in the formation of a pressure differential between the inner chamber 48 and the outer chamber 50. This pressure differential results in a flow of gas and lubrication liquid from the inner chamber 48 through the passage 52 into the outer chamber 50. As the gas flows from the inner chamber 48 through the passage 52 into the outer chamber 50, lubrication liquid 32 becomes entrained in the flow of gas and is drawn through the passage 52 into the outer chamber 50.

When the press assembly is subsequently operated from the closed condition to the open condition, the force against the piston rod 24 is reduced. The gas (nitrogen) pressure in the inner chamber 48 is then effective to move the piston 20 upward along the inner side surface 22 of the inner wall 18 toward the upper end wall 16. As this occurs, gas pressure in the chamber 48 is reduced.

Reducing the gas pressure in the inner chamber 48 (FIG. 1) results in a flow of gas and lubrication liquid 32 from the outer chamber 50 through the passage 52 into the inner chamber 48. This gas flows at a relatively high speed through the passage 52 and forms a jet or stream which sprays lubrication liquid onto the inner side surface 22 of the inner wall 18. This results in a mist of lubrication liquid being formed in the inner chamber 48 and the depositing of a film of lubrication liquid 32 on the inner side surface 22 of the inner wall 18.

The cylindrical inner wall 18 extends into a cylindrical recess 60 (FIGS. 1 and 2) formed in the lower end wall 14. A cylindrical outer side surface 64 on the inner wall 18 engages a cylindrical inner side surface 66 of the recess 60. Thus, the lower (as viewed in FIGS. 1 and 2) end portion of the inner wall 18 is telescopically received in and engages the recess 60 in the lower end wall 14. Engagement of the outer side surface 64 on the inner wall 18 with the inner side surface 66 of the recess 60 blocks a flow of gas and/or lubrication liquid 32 between the inner chamber 48 and outer chamber 50 except at the passage 52.

The passage 52 is formed by a cylindrical hole 70 (FIGS. 1–3) which extends through the lower end wall 14. The hole 70 extends from a circular lower end surface 74 (FIGS. 1 and 2) of the lower end wall 14 to an annular upper end surface 76 of the lower end wall 14. The hole 70 intersects the cylindrical side surface 66 of the recess 60 (FIGS. 2 and 3).

Figures 2, 3:
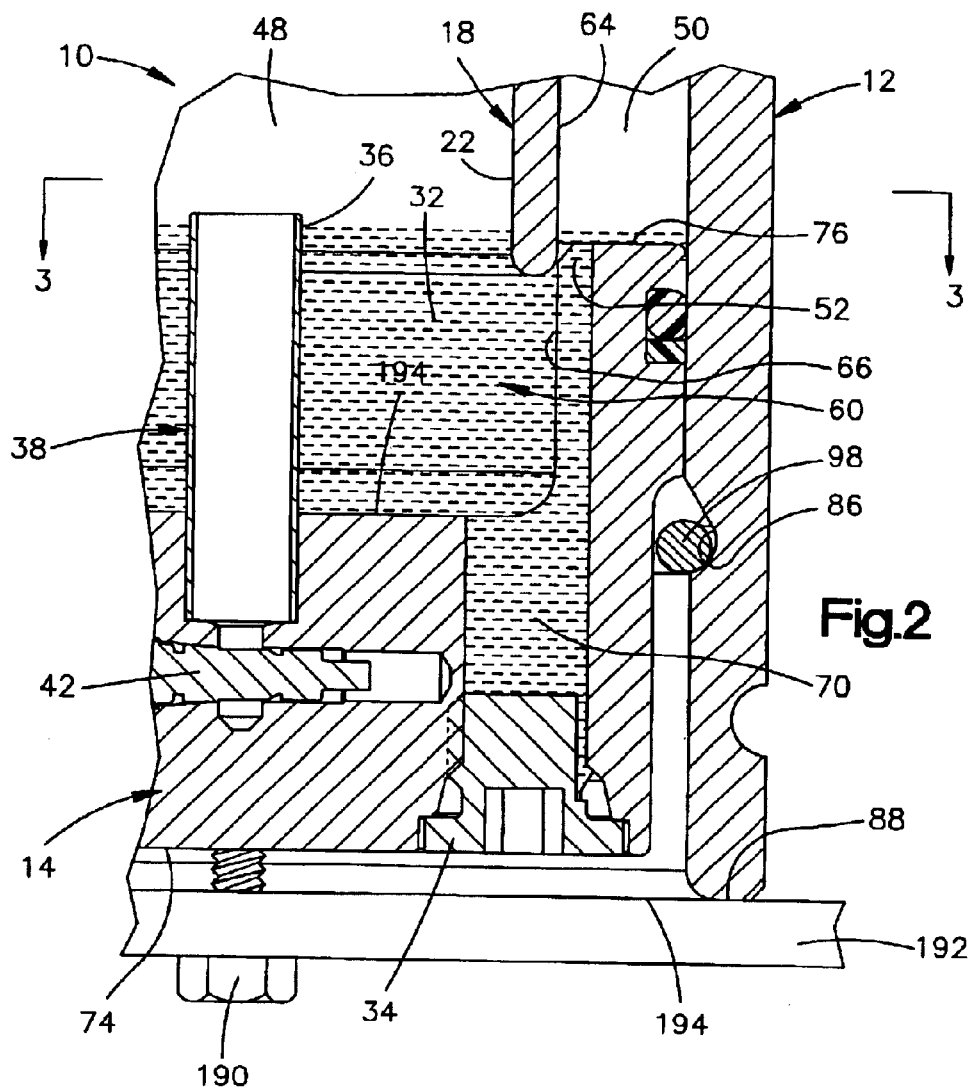
FIG. 2 is an enlarged fragmentary view of a portion of the cushion assembly of FIG. 1 and illustrating the manner in which the cushion assembly is mounted on a support member in a press.
FIG. 3 is a fragmentary plan view, taken generally along the line 3—3 of FIG. 2, illustrating a relationship of an inner wall of the cushion assembly to a recess in a lower end wall of the cushion assembly.

The inner wall 18 extends across the hole 70 (FIG. 3) and cooperates with the upper (as viewed in FIG. 2) portion of the hole 70 to form the passage 52 (FIGS. 2 and 3). This results in the passage 52 having an arcuate cross sectional configuration. The passage 52 is defined by the cylindrical hole 70 and the cylindrical outer side surface 64 of the inner wall 18.

In the specific embodiment of the cushion assembly 10 illustrated in FIGS. 1—3, the inner wall 18 extends for a relatively short distance into the recess 60. This results in a relatively small amount of overlap between the outer side surface 64 on the inner wall 18 and the side surface 66 of the recess 60. If desired, the extent to which the inner wall 18 extends into the recess 60 may be increased. This would result in the passage 52 having an increased length.

Method of Assembly

When the cushion assembly 10 is to be assembled, the outer wall 12 is formed. In order to facilitate construction of a cushion assembly with any one of a plurality of different lengths, the outer wall 12 may be cut to a desired length from a relatively long piece of tubular cylindrical pipe. Once the outer wall 12 has been cut to the desired length, a lower annular groove 86 (FIG. 4) is formed in the outer wall 12. The annular groove 86 is disposed adjacent to the annular lower end surface 88 of the outer wall 12. The annular groove 86 has a generally semi-circular cross sectional configuration as viewed in a radial plane through a central axis of the outer wall 12 (FIG. 4).

In addition, an upper groove 92 is formed in the outer wall 12. The upper groove 92 also has a generally semi-circular cross sectional configuration as viewed in a radial plane extending through the central axis of the outer wall 12. The upper groove 92 is disposed adjacent to an annular upper end surface 94 of the outer wall 12.

Figure 4:
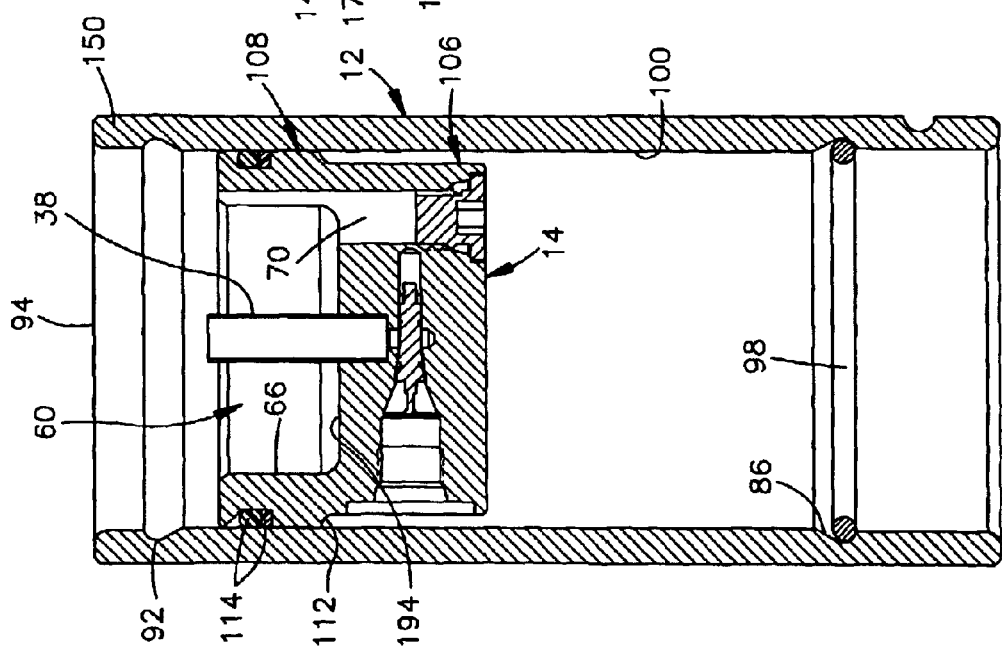
FIG. 4 is a schematic illustration depicting the manner in which the lower end wall of the cushion assembly is moved into an outer wall of the cushion assembly after a lock ring has been positioned adjacent to the lower end portion of the outer wall.

Once the lower and upper grooves 86 and 92 have been formed in the outer wall 12, a toroidal lock ring 98 is positioned in the lower groove 86, in the manner illustrated in FIG. 4. The lock ring 98 has a radial gap (not shown) which allows the lock ring to be compressed so that its diameter becomes less than the diameter of the cylindrical inner side surface 100 of the outer wall 12. This results in the lock ring 98 snapping into the lower groove 86 and pressing radially outward against the inner side surface of the lower groove 86.

Once the lower lock ring 98 has been positioned in the outer wall 12, the lower end wall 14 is axially aligned with the tubular cylindrical outer wall 12. The lower end wall 14 has a lower end portion 106 (FIG. 4) with a relatively small diameter and an upper end portion 108 with a relatively large diameter. The diameter of the lower end portion 106 of the end wall 14 is slightly less than the inside diameter of the lock ring 98. Therefore, the lower end portion of the lower end wall 14 can move axially through lock ring 98. However, the upper end portion 108 has a diameter which is greater than the inside diameter of the lock ring 98.

An annular shoulder 112 formed between the lower and upper end portions 106 and 108 of the end wall 14 moves downward (as viewed in FIG. 4) into engagement with the lock ring 98. Annular seals 114 are provided on the upper end portion 108 of the end wall 14. The seals 114 engage the inner side surface 100 of the outer wall 12 and block fluid flow between the outer wall 12 and the lower end wall 14.

Figure 5:
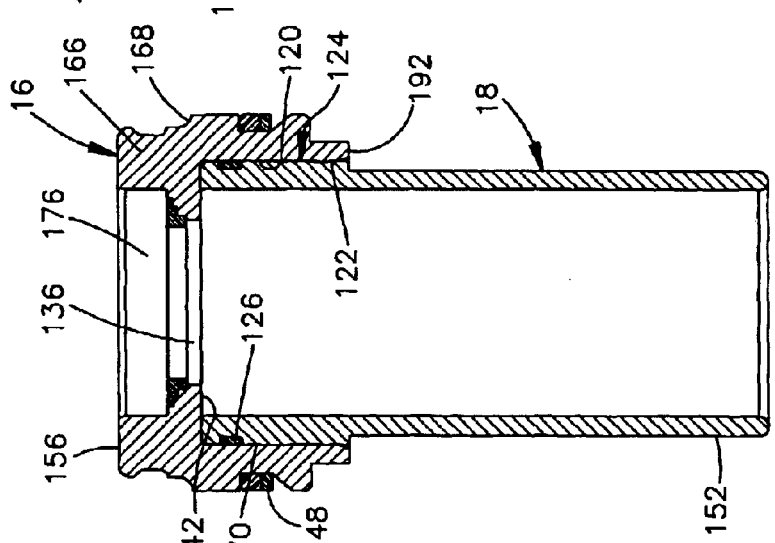
FIG. 5 is a schematic illustration depicting the manner in which the inner wall of the cushion assembly is positioned in a recess in an upper end wall of the cushion assembly.

The upper end wall 16 and the inner wall 18 (FIG. 5) are interconnected before they are positioned in the outer wall 12. When the inner wall 18 is to be connected with the upper end wall 16, the tubular cylindrical inner wall is telescopically inserted into a cylindrical recess 120 formed in the upper end wall. The recess 120 has a circular configuration and engages a cylindrical outer side surface 122 on an upper end portion 124 of the inner wall 18.

A seal 126 (FIG. 5) is disposed in an annular groove in the upper end portion 124 of the inner wall 18. The seal 126 engages the cylindrical inner side surface of the recess 120 to prevent leakage of gas between the inner wall 18 and the upper end wall 16. The seal 126 also serves to grip the cylindrical inner side surface of the recess 120 with sufficient force to prevent relative movement between the inner wall 18 and upper end wall 16.

Figure 6:
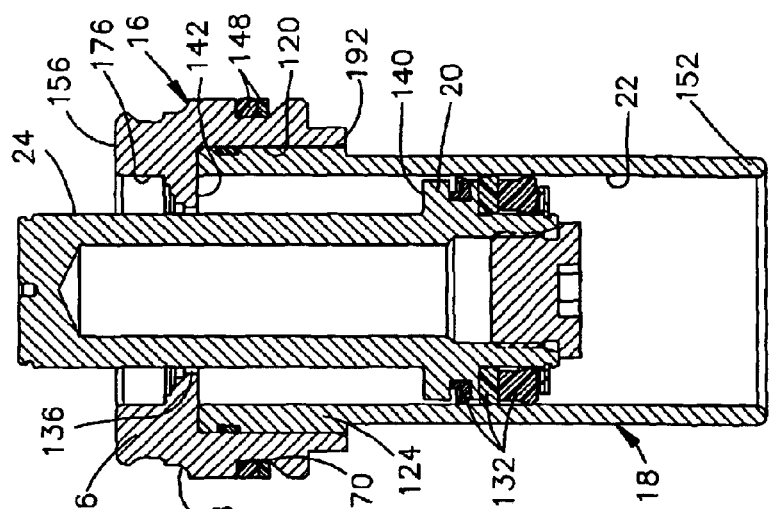
FIG. 6 is a schematic illustration depicting the manner in which a piston is positioned in the inner wall of the cushion assembly prior to installation of the piston, inner wall and upper end wall of the cushion assembly in the outer wall of FIG. 4.

The piston 20 is then positioned in the inner wall 18 (FIG. 6). To position the piston 20 in the inner wall 18, the piston rod 24 and piston 20 are positioned in axial alignment with the inner wall 18. The piston 20 and piston rod 24 are then moved into the inner wall 18 with the piston rod leading (FIG. 6).

As the piston 20 and piston rod 24 are moved into the inner wall 18, annular seals 132 on the piston 20 move into sealing engagement with inner side surface 22 of the inner wall 18. As the piston 20 moves along the inner side surface 22 of the inner wall 18, the piston rod 24 enters a circular hole 136 (FIG. 5) in the upper end wall 16. Continued movement of the piston 20 toward the upper end wall 16 results in an annular end surface 140 (FIG. 6) on the piston 20 moving into abutting engagement with an annular end surface 142 of recess 120 in the upper end wall 16.

The piston 20, inner wall 18, and upper end wall 16 are simultaneously positioned relative to the outer wall 12 and lower end wall 14. At this time, the lower end wall 14 is disposed in the outer wall 12 in engagement with the lock ring 98. The inner wall 18 is axially aligned with the open upper end portion 150 (FIG. 4) of the outer wall 12. The piston 20, inner wall 18 and upper end wall 16 are then moved together in a downward direction (as viewed in FIG. 4) into the outer wall 12.

The inner wall 18 moves into a telescopic relationship with the outer wall 12. At this time, the piston 20 is enclosed by the inner wall 18 and the piston rod 24 extends outward the upper end wall 16 (FIG. 6). As this occurs, the upper end wall 16 moves into engagement with the inner side surface 100 (FIG. 4) of the outer wall 12. Continued axial movement of the upper end wall 16 into the outer wall 12 moves annular seals 148 on the outside of the upper end wall 16 into engagement with the inner side surface 100 of the outer wall 12.

As the upper end wall 16, inner wall 18 and piston 20 continue to be moved axially into the outer wall 12, a leading or lower end portion 152 of the inner wall 18 moves into the upper end portion of the recess 60 in the lower end wall 14 in the manner illustrated in FIG. 1. After this has occurred, an annular upper side surface 156 (FIGS. 5 and 6) on the upper end wall 16 moves downward (as viewed in FIG. 4) past the annular upper groove 92. When this happens, movement of the upper end wall into the outer wall 12 is interrupted. A lock ring 162 (FIG. 1) is then snapped into the upper groove 92 (FIG. 4) in the outer wall 12.

Force is then applied to the piston rod 24 to pull the piston 20, inner wall 18 and upper end wall 16 axially outward toward the lock ring 162 (FIG. 1). As this occurs, a relatively small diameter upper end portion 166 of the upper end wall 16 moves through the lock ring 162. An annular shoulder 168 (FIG. 6) between the relatively small diameter upper end portion 166 and a relatively large diameter lower portion 170 of the upper end wall then moves into engagement the lock ring 162 to block further outward movement of the upper end wall. This results in the upper end wall 16, inner wall 18 and piston 20 being moved to the position illustrated in FIG. 1 relative to the outer wall 12. At this time, the lower end portion 152 of the inner wall 18 is disposed in the recess 60 in the lower end wall 14.

Once the upper end wall 16, inner wall 18 and piston 20 have been positioned relative to the outer wall 12 in the manner previously explained, annular seals 174 (FIG. 1) are positioned in a circular recess 176 formed in the upper end portion 166 of the upper end wall 16. Dust seal rings 182 may be positioned between the upper end portion 166 of the upper end wall 16 and the outer wall 12. The seal rings 182 block entrance of material from the environment around the cushion assembly 10 into the space between the relatively small diameter upper end portion 166 of the upper end wall 16 and the inner side surface 100 of the outer wall 12.

The inner wall 18 (FIG. 1) has a length which is greater than the distance between the upper end surface 76 on the lower end wall 14 and the upper end surface of 142 of the recess 120 in the upper end wall when the shoulder 168 engages the upper lock ring 162. Similarly, the inner wall 18 has a length which is greater than the distance between an annular lower end surface 192 of the upper end wall 16 and a circular lower end surface 194 of the recess 60 in the lower end wall 14 when the shoulder 168 engages the upper lock ring. Therefore, the inner wall 18 can not move out of the recesses 60 and 120 in the lower and upper end walls 14 and 16. It is contemplated that the seal ring 126 will prevent axial movement of the inner wall 18 relative to the outer wall 12. However, if the inner wall 18 does move axially relative to the outer wall 12, the lower end portion 152 of the inner wall 18 will remain in the recess 60 in the lower end wall 14 and the upper end portion 124 of the inner wall will remain in the recess 120 in the upper end wall 16.

The lubrication liquid 32 (FIG. 1) is then poured into the cushion assembly 10 through the hole 70. Once the plug 44 has been screwed into position to block the hole 70, the valve 42 is connected with a source of gas under pressure. Although any desired gas may be utilized, in the present instance, nitrogen gas is utilized.

The nitrogen gas is conducted through the valve 42 and standpipe 38 to the inner and outer chambers 48 and 50. When the pressure in the inner and outer chambers 48 and 50 have reached their desired pressure, the valve 42 is disconnected from the source of gas under pressure. The plug 44 is then screwed into place.

The high pressure in the inner chamber 48 is effective to press the piston 20 against the upper end wall 16. Axially upward (as viewed in FIG. 1) movement of the upper end wall 16 is blocked by engagement of the shoulder 168 on the upper end wall 16 with the lock ring 162. The fluid pressure in the inner and outer chambers 48 and 50 is effective to press the shoulder 112 on the lower end wall 14 against the lock ring 98.

When the cushion assembly 10 is to be mounted in a press, a bolt or other fastener 190 (FIG. 2) extends through an opening in a support member 192 into internally threaded openings (not shown) in the lower end wall 14 of the cushion assembly 10. The outer wall 12 of the cushion assembly 10 extends for a very short distance downward (as viewed in FIG. 2) past the lower end wall 14. Therefore, when the fastener 190 is tightened, the lower end wall 14 is pulled downward toward the support member 192.

The annular end surface 88 on the outer wall 12 is pressed against upper side surface 194 on the support member 192 under the influence of force transmitted from the lower end wall 14 through the lock ring 98 to the outer wall 12. The lower side wall 14 is spaced from the upper side surface 194 of the support member 192. Therefore, there is a constant tension force pressing the end surface 88 on the outer wall 12 against the support member 192 to hold the cushion assembly in place. Although only a single fastener 190 has been illustrated in FIG. 2, it should be understood that a plurality of fasteners may be utilized if desired.

Conclusion

In view of the foregoing description, it is apparent that the present invention includes a new and improved cushion assembly 10 for use in a press. The cushion assembly 10 has tubular cylindrical inner and outer walls 12 and 18. The outer wall 12 encloses lower and upper end walls 14 and 16.

The inner wall 18 lower and upper end portions 124 and 152 which are disposed in recesses in the lower and upper end walls 14 and 16. A piston 20 is disposed in the inner wall 18. A piston rod 24 extends through an opening 136 in the upper end wall 16.

A passage 52 is formed between an end portion 152 of the inner wall 18 and the lower end wall 14. This passage 52 conducts a flow of lubrication liquid 32 and gas to lubricate components of the cushion assembly during operation of the press.

The cushion assembly may be assembled by positioning a first lock ring 98 in a first groove 86 formed in an outer wall 12 of the cushion assembly 10. A first end wall 16 is then moved along an inner side surface 100 of the outer wall 12 into engagement with the first lock ring 98. A tubular inner wall 18 is positioned in a recess 120 in a second end wall 16. A piston 20 is positioned in the inner wall 18. The inner wall 18, second end wall 16, and piston 20 are moved together into the outer wall 12. A second lock ring 162 is then positioned in a second groove 92 formed in the outer wall.

Having described the invention, the following is claimed:

1. A cushion assembly for use in a press, said cushion assembly comprising a tubular cylindrical outer wall, a first end wall at least partially enclosed by a first end portion said outer wall, said first end wall having a first recess formed therein, a second end wall at least partially enclosed by a second end portion of said outer wall, said second end wall having a second recess formed therein, a tubular cylindrical inner wall extending between said first and second recesses, said inner and outer walls cooperating with said first and second end walls to at least partially define an outer chamber containing gas under pressure and lubrication liquid, said inner wall cooperating with said first and second end walls to at least partially define an inner chamber containing gas under pressure and lubrication liquid, a piston disposed in said inner chamber, a piston rod connected with said piston and extending through said second end wall, said piston being movable along an inner side surface of said inner wall in a direction toward said second end wall under the influence of gas pressure in said inner chamber during operation of the press, said piston being movable along the inner side surface of said inner wall in a direction away from said second end wall under the influence of force transmitted from the press through said piston rod to said piston during operation of the press, and a passage formed between an end portion of said inner wall and first end wall to conduct a flow of lubrication liquid and gas from said outer chamber to said inner chamber during movement of said piston toward said second end wall and to conduct a flow of lubrication liquid and gas from said inner chamber to said outer chamber during movement of said piston away from said second end wall.

2. A cushion assembly as set forth in claim 1 wherein said inner wall has an axial extent which is greater than a distance between an end surface of said first recess and an inner end surface of said first end wall to retain opposite end portions of said inner wall in said first and second recesses in the event of axial movement of said inner wall relative to said first recess.

3. A cushion assembly as set forth in claim 1 wherein said passage is formed between an outer side surface on said inner wall and a side surface of said first recess in said first end wall.

4. A cushion assembly as set forth in claim 1 wherein said first end wall includes an end surface which faces away from said second end wall, said outer wall extends past said end surface on said first end wall to enable an end of said outer wall to engage a mounting surface with said end surface on said first end wall spaced from the mounting surface.

5. A cushion assembly as set forth in claim 1 wherein said first recess in said first end wall has an end surface which faces toward said second end wall, said second recess in said second end wall has an end surface which faces toward said first end wall, said inner wall having a first end surface which is disposed in said first recess and is spaced from said end surface of said first recess, said inner wall having a second end surface which is disposed in said second recess and is disposed in engagement with said end surface of said second recess.

6. A cushion assembly as set forth in claim 5 further including a seal ring mounted on said inner wall and disposed in engagement with a cylindrical side surface of said second recess.

7. A cushion assembly as set forth in claim 1 wherein said first recess has a cylindrical side surface which engages a cylindrical outer side surface on said inner wall, said passage being formed by surface on said first end wall which is disposed radially outward from and faces toward said cylindrical outer side surface on said first end wall.

8. A method of assembling a cushion assembly for use in a press, said method comprising the steps of positioning a first lock ring in a first groove formed in a cylindrical inner side surface of a tubular outer wall at a location adjacent to a first end of the outer wall, moving a first end wall into the outer wall through a second end of the outer wall, moving the first end wall along the cylindrical inner side surface of the outer wall into engagement with the first lock ring, positioning a tubular inner wall in a recess in a second end wall, positioning a piston in the inner wall, positioning a piston rod extending from the piston in an opening extending through the second end wall, thereafter, moving the inner wall, second end wall and piston together into the outer wall through an opening adjacent a second end of the outer wall, and positioning a second lock ring in a second groove formed in the cylindrical inner side surface of the outer wall at a location adjacent to the second end of the outer wall.

* * * * *